US005981013A

United States Patent [19]

Russ et al.

[11] Patent Number: 5,981,013

[45] Date of Patent: Nov. 9, 1999

[54] PERFORATING BLADE/LABEL PERFORATING

[75] Inventors: Timothy J. Russ, Niagara Falls; Khal M. Khatib, Youngstown; Jay O. Baker, Grand Island, all of N.Y.

[73] Assignee: Moore Business Forms, Inc., Grand Island, N.Y.

[21] Appl. No.: 08/321,025

[22] Filed: Oct. 6, 1994

[51] Int. Cl.[6] .......... B32B 3/10

[52] U.S. Cl. .......... 428/43; 428/136

[58] Field of Search .......... 428/43, 136, 131; 206/390

[56] References Cited

U.S. PATENT DOCUMENTS

| | | | |
|---|---|---|---|
| 2,049,030 | 7/1936 | Strauss | 428/43 |
| 4,745,835 | 5/1988 | Schnitzer | 83/678 |
| 5,114,771 | 5/1992 | Ogg et al. | 428/43 |
| 5,240,755 | 8/1993 | Zimmer | 428/40 |
| 5,354,588 | 10/1994 | Mitchell et al. | 428/40 |
| 5,537,905 | 7/1996 | Zimmer | 83/660 |

FOREIGN PATENT DOCUMENTS

| | | | |
|---|---|---|---|
| 2909276 | 9/1980 | Germany | 428/43 |

*Primary Examiner*—Alexander Thomas
*Attorney, Agent, or Firm*—Nixon & Vanderhye, P.C.

[57] ABSTRACT

A web of labels, particularly linerless labels, is produced which has specially formed perforation lines that are neither too strong or too weak. Each perforation line comprises alternating cuts and ties, including a cut to tie ratio of 0.18×0.008 to 0.012×0.008, and between 30–58 cuts per inch. Where permanent adhesive is used for the linerless labels, each perforation line comprises 45–58 cuts per inch, and has a percent of hold of 45–58%, with each cut having a thickness of about 0.028 inches. When repositional adhesive is used each perforation line comprises 30–45 cuts per inch, with a percent of hold of 25–35%. At least one, and typically substantially all, of the perforation lines have substantially V or U-shaped enlarged end terminations to facilitate dispensing of the labels. The perforations are formed by applying a perforation pressure of about 500–600 lbs. per inch to a perforating blade having a number of linearly spaced carbon steel (Rockwell hardness of C-32 to C-48) teeth, with 30–58 teeth per inch and each tooth having a thickness of about 0.025–0.030 inches and a height of about 0.930–0.946 inches.

14 Claims, 2 Drawing Sheets

PERFORATING BLADE/LABEL PERFORATING

BACKGROUND AND SUMMARY OF THE INVENTION

With the advent of a wide variety of different types of adhesives, computer controlled printers, and other chemicals and equipment, labels—particularly linerless labels—have become a widely used type of business form. However only recently have the mechanics of different types of labels, particularly linerless labels, been studied with respect to their utilization with conventional printing and dispensing equipment, to determine whether or not their performance is optimum. It has been found, according to the present invention, when making such evaluations that the perforating lines separating one label from another has not in the past been optimum, the perforation lines typically either being too strong or too weak.

If a label perforation line is too weak then the web will tear during subsequent adhesive and/or release coating steps, or during printing, during manufacture of the labels, and may also tear during dispensing depending upon the equipment utilized. If the paper web breaks during production, the web has to be reintroduced in the processing apparatus, often by hand, requiring significant down time and a waste of material. On the other hand if the label perforation line is too strong, one often encounters problems with corner tears when dispensing the labels, and other customer frustration in trying to separate the labels from the webs. Of course torn labels leads to waste in addition to frustration.

According to the present invention a particular perforating blade is utilized which allows the production of a web of linerless label, and a method of producing linerless labels, which have optimum perforation line strength The web at the perforation lines is strong enough so that it will not break during normal processing, producing the final product, and allowing perforating to be the first step in production (which is much more convenient since the perforating blades then do not become contaminated with adhesive, release coating, or the like). The perforation lines formed according to the invention also are not too strong, so that they separate properly when being dispensed. Also according to the present invention it has been recognized for the first time that the requirements for the perforation lines are different depending upon whether permanent adhesive or repositional adhesive is utilized for the labels.

According to one aspect of the present invention, a web of linerless labels including a paper substrate having an adhesive layer on a first face thereof, and a release coating on a second face thereof, a pair of side edges, and a dimension of elongation, is provided. The web comprises: A plurality of substantially parallel perforation lines formed in the web generally perpendicular to the dimension of elongation, and defining the web into individual labels. And, each perforation line comprising alternating cuts and ties, and including a cut to tie ratio of 0.018×0.008 to 0.012×0.008, and between 30–58 cuts per inch.

When the adhesive is permanent adhesive, each perforation line comprises 45–58 cuts per inch, with 48 being optimum, and each perforation line has a percent of hold of 45–58%, with 50% being the optimum. The term "percent of hold" as used in the label art, and in the specification and claims herein, refers to the amount of uncut material remaining after perforating has been accomplished. Thus if the percent of hold is 45% that means that 55% of the material along the perforation line has been removed when making the perforation.

When the adhesive is repositional adhesive, each perforation line comprises 30–45 cuts per inch, with 38 being optimum, and a percent of hold of 25–35%, with 30% being optimum, is provided.

For both the permanent and repositional adhesive labels, each perforation line cut has a thickness (corresponding to the thickness of the blade which performs the cutting) of about 0.025–0.030 inches, with 0.028 inches optimum. Also, particularly when the labels are quadrate in configuration (the vast majority of labels) the strength of a perforation can actually be slightly increased toward the upper ends of the ranges set forth above as the corner tearing problem, typically associated with perforation lines that are too strong, is essentially eliminated by forming substantially V or U-shaped enlarged end terminations of the perforation lines (sideways cutouts).

According to another aspect of the present invention a perforating blade for perforating labels is provided. The blade is ideally suited for use with linerless labels, although it may also be used in the production of lined labels. The blade comprises a steel body and steel teeth upstanding from the a steel body. The teeth are linearly spaced and each tooth has a thickness of 0.025–0.030 inches (0.028 inches optimum), and 30–58 teeth are provided per inch, the teeth positioned on the blades so that they provide a cut to tie ratio of 0.018×0.008 to 0.012×0.008. The teeth have a height of about 0.930–946 inches (0.938 inches being optimum). The body and teeth are capable of withstanding thousands of repeated applications of about 500–600 psi without failure during perforation of a label web. Preferably the teeth are carbon steel having a Rockwell hardness of C-32 to C-48. The blade may be part of a perforation cylinder.

Where the blade is designed for perforating repositional adhesive webs, 30–45 teeth are provided per inch, and they are spaced and positioned so as to form 25–35% of hold label perforation lines. Where the blade is designed for use with permanent adhesive labels, 45–58 teeth are provided per inch, and they are spaced and positioned so as to form 45–58% of hold label perforation lines.

The invention also comprises a method of producing linerless labels using a paper web having first and second faces. The method comprises the steps of: (a) while feeding the paper web in a first direction, printing the first face of the web. (b) Perforating the paper web by applying a perforation pressure of about 500–600 pounds per inch to a perforating blade to form perforation lines in a direction generally perpendicular to the first direction, each perforation line comprising alternating cuts and ties, and including a cut to tie ratio of 0.018×0.008 to 0.012×0.008, and between 30–58 cuts per inch. (c) Applying a release coating to the first face of the web. And, (d) applying a pressure sensitive adhesive layer to the second face of the web. Steps (a) through (d) may be practiced sequentially, or in other sequences.

When step (d) is practiced to apply permanent adhesive, step (b) is practiced to produce a percent of hold of between 45–58%, and 45–58 cuts per inch. When step (d) is practiced to apply repositional adhesive, step (b) is practiced to produce a percent of hold of between 25–35%, and 30–45 cuts per inch. There may also be the further step of forming substantially V or U-shaped cutouts at the ends of at least one of the perforation lines, and typically at the ends of all of the perforation lines, e.g. using a die cutting cylinder.

It is the primary object of the present invention to provide optimized perforation lines in label webs, particularly linerless label webs. This and other objects of the invention will become clear from an inspection of the detailed description of the invention and from the appended claims.

DETAILED DESCRIPTION OF THE DRAWINGS

Figure 1:
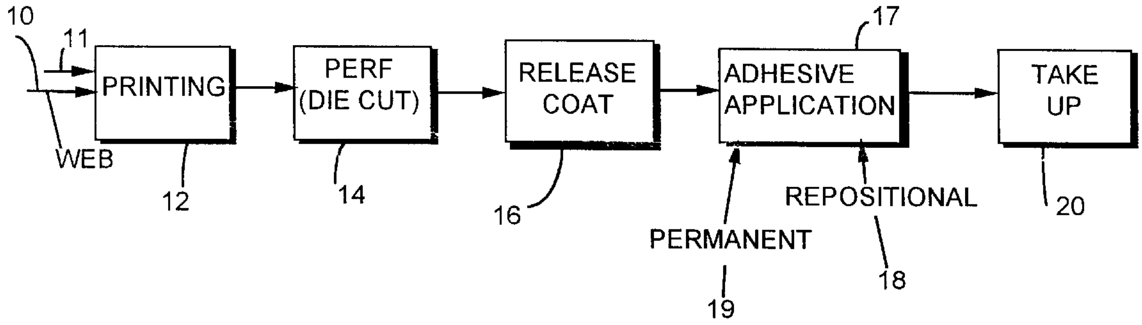
FIG. 1 is a block diagram schematically illustrating various method steps that may be practiced in the method of producing linerless labels according to the present invention.

FIG. 1 schematically illustrates the production of linerless labels according to the method of the present invention, having optimized perforations therein. A web of paper 10 is fed in a first direction 11 and is acted upon at print stage 12.

With respect to the particular embodiment in FIG. 1, in the printing stage 12 indicia is applied, by any suitable impact or non-impact printing technique, to the first face of the web 10. Particular indicia is illustrated at 15 in FIG. 3, and may be variable, non-variable, or both. Also while printing typically is always on the first face of the web 10, it also may be applied to the second face too.

Typically after the printing stage 12 the web is perfed, adhesive is applied, and a release coating is applied. While these stages are illustrated in a particular sequence in FIG. 1, it is to be understood that all stages illustrated in FIG. 1 may be in different sequences depending upon the particular situation involved. For permanent adhesive linerless labels the procedure may be print, perf, release coat, adhesive coat, take-up. For repositional adhesive the procedure may be print, release coat, adhesive coat, perf, and take-up.

At perf stage 14 perforation lines are formed in the web 10. The perforation lines typically are perpendicular to the direction of movement 11 and are formed by applying a perforation pressure of about 500–600 lbs. per inch (typically about 550 lbs. per inch) to a perforating blade. An exemplary perforating blade for that purpose is shown generally by reference 13 in FIG. 4 (and will be described hereafter).

In the perf stage 14 perforation lines are formed in which each perforation line comprises alternating cuts and ties. There is a cut to tie ratio of 0.018×0.008 to 0.012×0.008, and between this minimum and maximum respectively the standard cut to tie ratio is 0.016×0.008. This cut to tie ratio is utilized for both permanent and repositional labels. Also in the perforating stage 12, 30–58 cuts are provided per inch, the number of cuts per inch and other variables depending upon whether permanent or repositional adhesive is utilized, and depending upon whether or not particular end terminations are provided for the perforation lines.

In the FIG. 1 embodiment the next treatment stage is stage 16 in which the release coat is provided to the first face of the web. The release coat is applied by conventional techniques, and typically is a silicone based release material which will not adhere to the adhesive applied at stage 17.

The next stage illustrated in FIG. 1 is the adhesive application stage 17, in which pressure sensitive adhesive is typically applied to the second face of the web 10 utilizing conventional equipment. The adhesive applied may be permanent adhesive, as illustrated schematically at 19 in FIG. 1, or repositional adhesive as indicated schematically at 18. Any suitable conventional label permanent or repositional (e.g. CLEANTAC® adhesive from Moore Business Forms, Inc.) may be utilized.

After steps 12, 14, 16, and 17 of FIG. 1—regardless of the order—the completed web is taken up, as indicated schematically by box 20 in FIG. 1. Normally the web is taken up in a roll form, although if desired the labels may be cut into sheets and stacked one sheet on top of another. Whether in rolled or sheet configuration, the adhesive face of one overlying portion of the web or sheet engages the release face of an underlying label roll or sheet.

FIG. 1 illustrates the most basic construction according to the present invention. A wide variety of other types of coatings may also be applied, however, and are within the scope of the present invention. For example various tie coats may be provided for causing the adhesive or the release coat to better adhere to the web 10. Also thermal imaging coats may be provided if the label is to be used with a thermal printhead. Exemplary linerless labels that are conventionally made and which are suitable for manufacture according to the present invention (having a perfing stage 14 thereof) are shown in U.S. Pat. No. 5,354,588 issued from Ser. No. 07/912,851 filed Jul. 13, 1992 and U.S. Pat. No. 5,292,713, the disclosures of which are hereby incorporated by reference herein.

Figure 2:
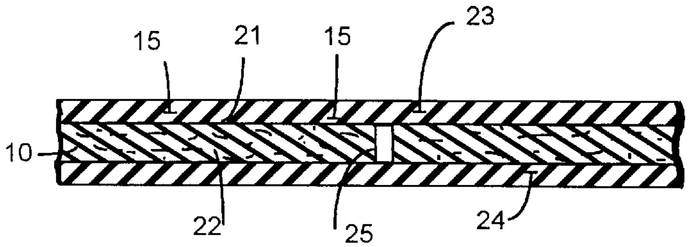
FIG. 2 is a side cross-sectional view, greatly enlarged for clarity of illustration, of a portion of an exemplary linerless label web according to the present invention.

FIG. 2 illustrates schematically a simplified form of an exemplary web of linerless labels according to the present invention comprising a paper substrate or web 10 having a first face 21 and a second face 22. The first face 21 has the indicia 15 thereon, and additionally the coating 23 of release material. The second face 22 has the pressure sensitive adhesive coating 24 thereon, either permanent adhesive or repositional adhesive. A cut 25 of a perforation line 26 (see FIG. 3) is also illustrated in FIG. 2, while FIG. 3 also illustrates the ties 27 between the cuts 25.

Figure 3:
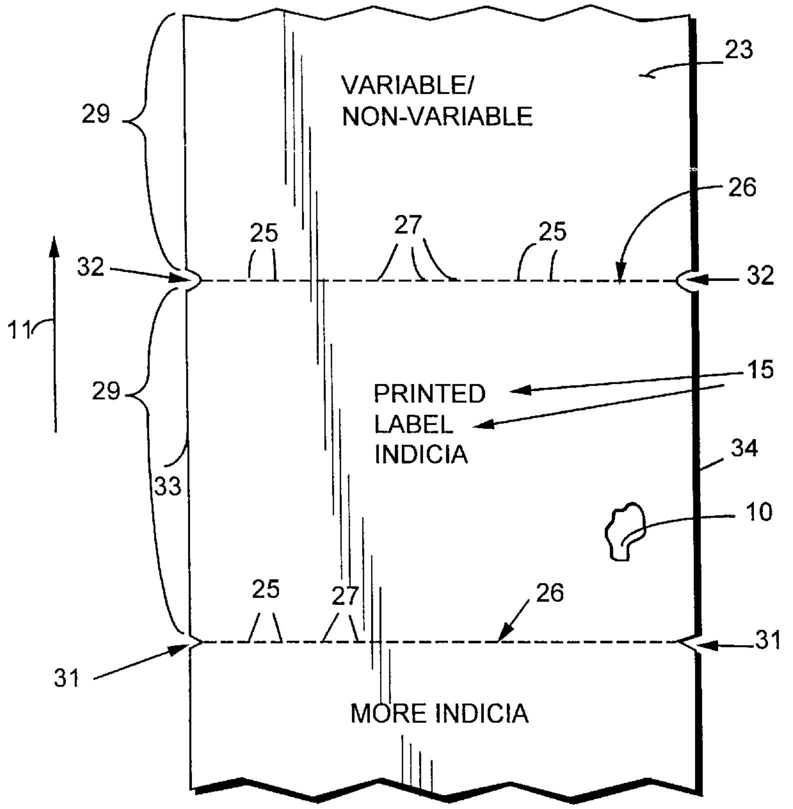
FIG. 3 is a top plan view of a portion of a web of linerless labels according to the present invention.

As seen in FIG. 3, the perforation lines 26, formed at the stage 12, define the web 10 into distinct labels 29. It is the particular nature of the perforation lines 26 that is unique according to the present invention, and which optimizes the entire label construction.

In the practice of the method of FIG. 1 and the production of perforation lines 26 of FIG. 3, between 30–58 cuts 25 are provided per inch in the perforation lines 26. The cuts 25 are regularly spaced from each other by the ties 27. When the adhesive layer 24 is permanent adhesive, 45–58 cuts 25 are provided per inch, with an optimum of 48. The cuts 25 typically have a thickness of about 0.025–0.030 inches, with an optimum of about 0.028 inches. Each perforation line 26 formed has a percent of hold of 45–58%, with 50% being the optimum.

When the adhesive layer 24 is repositional adhesive, then 30–45 cuts 25 are provided per inch in each perforation line 26, 38 being optimum. Each perforation line has a percent of hold of 25–35%, with 30% being optimum.

For both repositional and permanent adhesive linerless labels, it is desirable to provide V-shaped or U-shaped end terminations of the perforation lines 26. FIG. 3 illustrates the V-shaped end terminations at 31, and U-shaped end terminations 32. While two different shapes of perforation end terminations 31, 32 are illustrated in FIG. 3, it should be understood that normally a single type of end termination will be provided for a given web, or all of the end terminations on one side edge (e.g. 33) of the web will be of one type with all end terminations on the other side edge (34) of another type. The substantially V or U-shaped end terminations 31, 32 provide a scalloped edge of the labels, and since they cut out the corners of the labels, the corner tearing problem normally associated with dispensing of the labels is essentially eliminated. This means that the perforation lines 26—when the end terminations 31, 32 are utilized—can be at the "strong" end of the ranges described above. For example, for repositional adhesive labels there may be 30 cuts per inch, and a percent of hold of 35%, when end terminations 31, 32 are used.

While the invention has been described with respect to FIGS. 1 through 3 as the formation of a single width of labels 29 for a web 10, it is to be understood that exactly the same techniques would be utilized if a plurality of labels are formed from a web, in side-by-side relationship, with the edges 33 and/or 34 being formed by slitting either prior to or after take up at 20.

Figure 4:
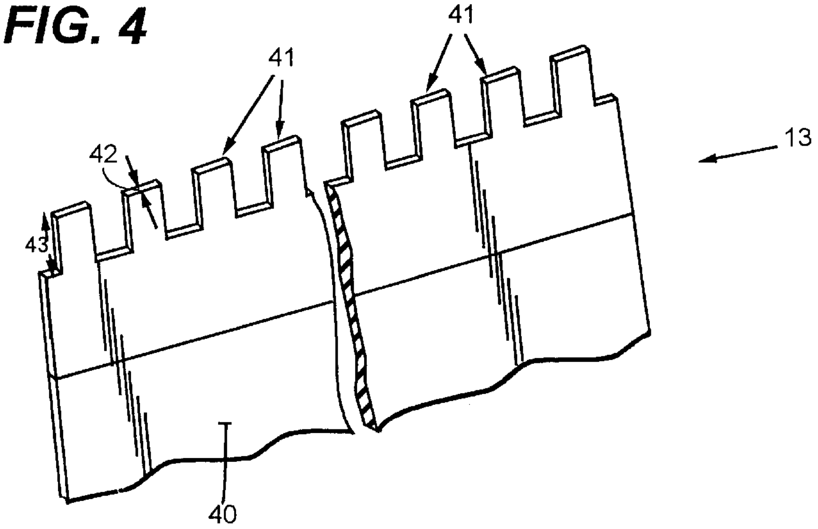
FIG. 4 is a top perspective view which schematically illustrates an exemplary perforating blade used in the method of FIG. 1 for producing the label web of FIGS. 2 and 3.

FIG. 4 illustrates, schematically, an exemplary blade 13 that may be utilized in the production of the particular perforation lines 26 described above. The blade has a steel body 40, and a plurality of steel teeth 41 upstanding from the body 40. Preferably the teeth 41 are formed of carbon steel having a Rockwell hardness of C-32 to C-48. There are 30–58 teeth 41 substantially equally spaced from each other, 30–45 teeth per inch for a blade 13 that is used for repositional labels and 45–58 teeth per inch for a blade used for permanent adhesive labels.

Each tooth 41 preferably has a thickness 42 of about 0.025–0.030 inches (forming a cut 25 of substantially that same thickness), with about 0.028 inches optimum, and a height 43 of 0.930–0.946 inches, with about 0.938 inches optimum. The blade 13 may be reciprocated or mounted on a perforation cylinder.

The end terminations 31, 32 are preferably formed by conventional die cutting cylinders or punch units, normally just after the perforations 26 have been formed in stage 14.

Where the blade 13 will be used to form perforation lines 26 in a plurality of labels 29 at the same time (that is in a web having a plurality of labels 29 side-by-side.

Figure 5:
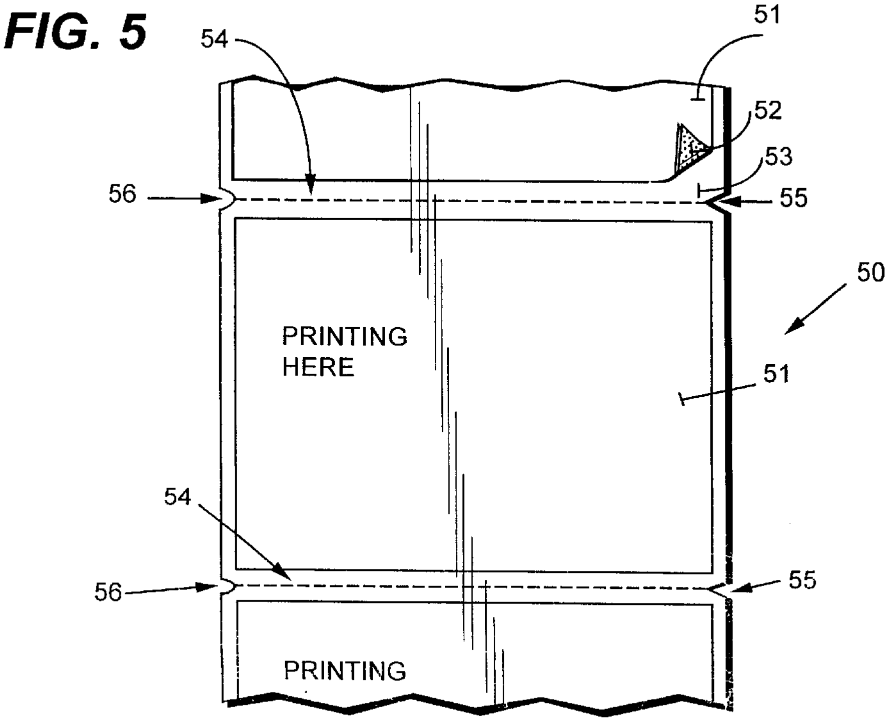
FIG. 5 is a top plan view of a web of lined labels which also may be produced utilizing the blade of FIG. 4.

While the invention is particularly applicable to linerless labels, the optimum perforations according to the invention also may be provided in lined labels. This is illustrated schematically in FIG. 5 for a label assembly 50. The label assembly 50 paper labels 51, having pressure sensitive adhesive 52 on the "bottom" faces thereof, are conveyed by a web 53 of release paper, e.g. conventional silicone coated paper, which does not adhere to the adhesive 52. In the release liner 53 between the labels 51 are the perforation lines 54 which correspond to the perforation lines 26 described with respect to FIG. 3, again depending upon whether the adhesive 52 is permanent or repositional. End terminations 55, 56 corresponding to the end terminations 31, 32 also may be provided.

It will thus be seen that according to the present invention a web of linerless labels and a method of producing linerless labels, and a particular perforating blade for perforating labels, are provided which are advantageous and provide optimum performance. While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent products, structures, and methods.

What is claimed is:

1. A web of linerless labels including a paper substrate having a pressure sensitive adhesive layer on a first face thereof, a release coating on a second face thereof, a pair of side edges, and a dimension of elongation, and comprising:

a plurality of substantially parallel perforation lines formed in said web generally perpendicular to said dimension of elongation, and defining said web into individual labels; and each perforation line comprising alternating cuts and ties, and including a cut to tie ratio of 0.018×0.008 to 0.012×0.008, and between 30–58 cuts per inch.

2. A web of linerless labels as recited in claim 1 wherein said adhesive of said adhesive layer is permanent adhesive, and wherein each perforation line comprises 45–58 cuts per inch.

3. A web of linerless labels as recited in claim 2 wherein each perforation line has a percent of hold of 45–58%.

4. A web of linerless labels as recited in claim 3 wherein each cut of each perforation line has a thickness of about 0.025–0.030 inches, and there are about 48 cuts per inch, and about 50% percent of hold.

5. A web of linerless labels as recited in claim 3 further comprising substantially V or U-shaped enlarged end terminations of at least one perforation line of said web, said end terminations disposed at the intersections between a perforation line and said side edges of said web.

6. A web of linerless labels as recited in claim 2 further comprising substantially V or U-shaped enlarged end terminations of at least one perforation line of said web, said end terminations disposed at the intersections between a perforation line and said side edges of said web.

7. A web of linerless labels as recited in claim 1 further comprising substantially V or U-shaped enlarged end terminations of substantially all of said perforation lines of said web, said end terminations disposed at the intersections between a perforation line and said side edges of said web.

8. A web of linerless labels as recited in claim 1 wherein said adhesive of said adhesive layer is repositional adhesive, and wherein each perforation line comprises 30–45 cuts per inch.

9. A web of linerless labels as recited in claim 8 wherein each perforation line has a percent of hold of 25–35%.

10. A web of linerless labels as recited in claim 9 wherein each cut of each perforation line has a thickness of about 0.025–0.030 inches, and there are about 38 cuts per inch, and about 30% percent of hold.

11. A web of linerless labels as recited in claim 9 further comprising substantially V or U-shaped enlarged end terminations of substantially all of said perforation lines of said web, said end terminations disposed at the intersections between a perforation line and said side edges of said web.

12. A web of linerless labels as recited in claim 8 further comprising substantially V or U-shaped enlarged end terminations of substantially all of said perforation lines of said web, said end terminations disposed at the intersections between a perforation line and said side edges of said web.

13. A web of linerless labels as recited in claim 1 wherein each cut of each perforation line has a thickness of about 0.025–0.030 inches, and there are about 48 cuts per inch, and about 50% percent of hold.

14. A web of linerless labels as recited in claim 1 wherein each cut of each perforation line has a thickness of about 0.025–0.030 inches, and there are about 38 cuts per inch, and about 30% percent of hold.

* * * * *